United States Patent [19]

Haertling

[11] 4,091,560
[45] May 30, 1978

[54] TRAP FOR AQUATIC SNAILS IN AQUARIUMS

[76] Inventor: Wolfgang Haertling, Fruehlingstr. 11 b, D-8261 Winhoering, Unterau, Germany

[21] Appl. No.: 747,930

[22] Filed: Dec. 6, 1976

[30] Foreign Application Priority Data

Dec. 10, 1975 Germany .......................... 393985[U]

[51] Int. Cl.² ...................... A01K 69/06; A01M 23/08
[52] U.S. Cl. ......................................... 43/66; 43/131; 43/100
[58] Field of Search ...................... 43/65, 66, 100, 102, 43/44.99, 131; 119/1, 4, 5, 51 R

[56] References Cited

U.S. PATENT DOCUMENTS 1,142,781  6/1915  Cameron .................................. 43/66
3,499,526  3/1970  Willinger ............................ 43/44.99
3,978,607  9/1976  Piere ....................................... 43/131

FOREIGN PATENT DOCUMENTS 148,775  10/1952  Australia ................................ 43/131

*Primary Examiner*—Robert E. Bagwill
*Assistant Examiner*—Daniel J. Leach
*Attorney, Agent, or Firm*—Craig & Antonelli

[57] ABSTRACT

A trap for aquatic snails in aquariums comprises a base plate and a basket containing a bait mounted thereon. The snails will gather around the bait basket and may be removed with the base plate after a certain time of exposure. A housing enclosing the base plate and the bait basket and having an inlet locked by inwardly tiltable locking pawls serves to prevent the snails from escaping after the bait has been consumed.

17 Claims, 3 Drawing Figures

TRAP FOR AQUATIC SNAILS IN AQUARIUMS

BACKGROUND OF THE INVENTION

In aquariums, aquatic snails increase in number rather quickly. Too many snails seriously affect the biological balance in an aquarium. The snails damage the water plants by gnawing at their leaves and roots thereby causing those plants to die and reducing the natural production of oxygen by water plants. In addition, the water in the aquarium is polluted and poisoned by excretions of living snails as well as putrefaction of dead snails.

Collecting the aquatic snails by hand is a tedious job. While chemicals may be used to kill the snails or inhibit their growth, such substances affect all species of aquatic snails. The dead snails must be removed from the aquarium. Moreover, the fish must be taken out of the chemically treated water and the water must be changed, thus causing additional work.

It is an object of the invention to provide a trap which allows catching aquatic snails and removing them from the aquarium in an easy manner thereby preventing the biological balance in the aquarium from being impaired.

SUMMARY OF THE INVENTION

A preferred embodiment of the trap according to this invention comprises a base plate and a perforated basket containing a bait, which basket is so dimensioned and may be so disposed on the base plate that a substantial portion of the base plate around the basket is left free. The snails and fish are attracted by the bait contained in the basket. As the basket prevents access to the bait by the fish, the fish will swim away after a short time, while the snails are slow enough to remain for an extended period in the vicinity of the bait basket on the base plate. Upon lapse of a certain time, the base plate with the aquatic snails sitting on it may be removed from the aquarium. The caught snails may be sorted out, and selected ones of them or specific species may be placed back into the aquarium. It is thus possible to remove only superfluous aquatic snails and to leave a desired amount of them in the aquarium without the disadvantages involved in the use of chemicals.

In a specifically preferred embodiment of the invention, the trap furthermore comprises a housing which can be mounted on the base plate so as to cover the upper side thereof and enclose the bait basket, the housing having a lateral opening and a plurality of locking pawls which allow entry into the housing but prevent exit therefrom. In this embodiment, the snails are prevented by the locking pawls from leaving the base plate as soon as they have arrived in the vicinity of the bait basket. It is thus possible, to leave the trap in the aquarium for a long period of time with the snails remaining caught even after the bait substance has dissolved and become ineffective.

According to another preferred embodiment, the housing is transparent and the locking pawls are opaque. This embodiment allows watching the operation of the trap and determination of the time at which the trap should be removed from the aquarium. The "sorting effect" by which snails are separated from fish is however retained because the opaque locking pawls appear as an obstacle to the fish which prevents them from swimming into the trap housing.

In a further preferred embodiment, the housing has a circular cross section and means for engaging a correspondingly shaped annular flange on the base plate to permit relative rotation between the housing and the base plate, thereby varying the distance between the basket, which is eccentrically disposed on the base plate, and the housing opening, whereby the effect of the bait may be adjusted.

BRIEF DESCRIPTION OF THE DRAWINGS

The invention and further aspects and advantages thereof will now be explained in connection with preferred embodiments with reference to the drawings, in which.

DESCRIPTION OF THE PREFERRED EMBODIMENTS

Figure 1:
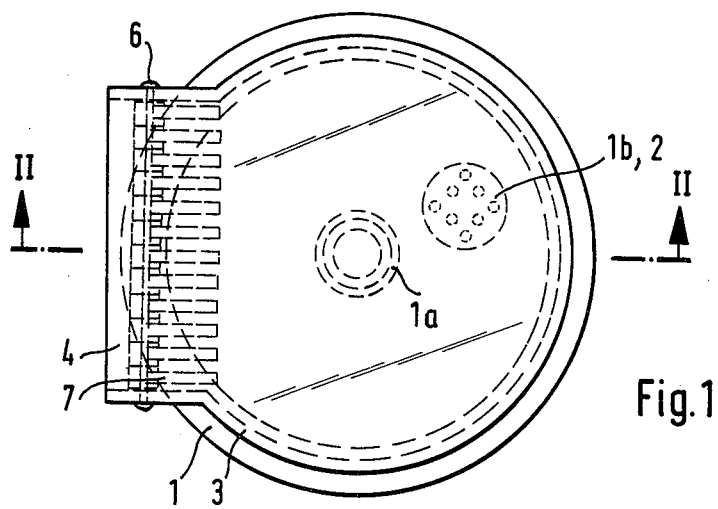
FIG. 1 is a plan view of the trap.
Figure 2:
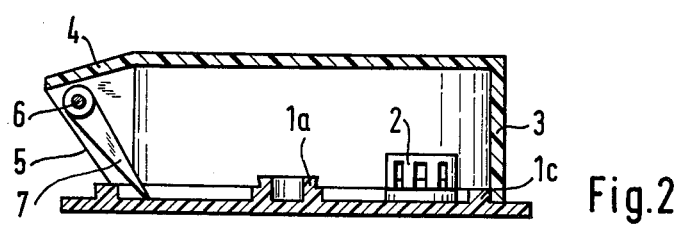
FIG. 2 is a cross-section taken along the line II—II in FIG. 1.

As shown in the drawing, the trap consists of a circular base plate 1, preferably made of plastics, a bait basket 2, preferably also made of plastics, and a housing 3 of transparent plastics. The housing 3 has a generally circular cross section and is held on the base plate 1 by snap engagement of the lower edge of the housing with a circular flange 1c provided on the base plate 1. The housing 3 has on one side a box-shaped extension 4 that forms a lateral opening 5. A horizontally extending shaft 6 is disposed within the extension 4 with a plurality of locking pawls 7 suspended from the shaft 6 parallel and close to each other. The locking pawls 7 are mounted for rotation about the shaft 6 and have such a length that they extend obliquely downwardly and inwardly with respect to the housing with their lower ends bearing on the base plate 1. The snails while being able to enter the trap are thus automatically prevented from escaping. As the locking pawls 7 consist of opaque material in contrast to the housing 3, they appear as an obstacle to the fish which will thus be hindered to swim into the interior of the trap.

Figure 3:
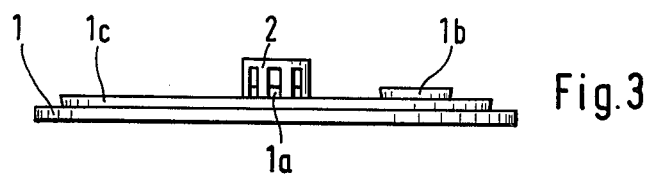
FIG. 3 is a side view of the base plate of the trap shown in FIG. 1 without the housing.

Two annular flanges 1a and 1b are integrally formed on the base plate 1 inside the housing 3, the flange 1a being disposed centrally and the flange 1b eccentrically of the base plate 1. The perforated bait basket 2 shown in FIG. 3 may be mounted on either of the two annular flanges by snap engaging the slotted and thus resilient lower edge of the bait basket 2 with the respective annular flange.

Dried fish food such as in the form of tablets which dissolve within several hours may be used as the bait. Alternatively, smelling substances may be employed. The bait is placed into the basket 2 which is mounted on one of the annular flanges 1a or 1b, whereupon the housing 3 is engaged with the base plate 1. The smelling substances or solid bait portions emerge through the perforations of the bait basket 2 and the opening 5 of the housing and attract the animals. Only aquatic snails will pass through the opening 5 locked by the pawls 7 and thus be trapped. From time to time, the trap is taken out of the aquarium and the snails are removed from the housing and sorted out, if desired.

The time at which the trapping effect begins may be determined in accordance with the distance of the bait from the opening 5, whereby the catching result may be controlled. The distance of the bait from the opening 5 may be varied by mounting the bait basket 2 on the eccentric annular flange 1b of the base plate 1 and accordingly rotating the housing 3 with respect to the base plate 1.

The trap may principally be used without the housing 3. In this case, the basket 2 including the bait will regularly be mounted on the central annular flange 1a. The slow aquatic snails will remain for an extended period of time on the base plate 1 in the vicinity of the bait basket 2 and can therefore be removed with the base plate without removing fish at the same time. The use of the housing 3, however, has the advantage that the snails remain caught and can be removed even after the bait has been consumed.

What is claimed is:

1. A trap for catching snails in an aquarium or the like, comprising:
   (a) a base plate,
   (b) housing means enclosing the upper surface of the base plate, said housing means having entry means movable by a snail or the like, whereby the snail will be permitted entry into the housing area, but denied exit therefrom,
   (c) bait basket means, and
   (d) mounting means for mounting the bait basket means on the base plate within said housing means at a position located eccentrically with respect to the center of the base plate,
   wherein said housing means and base plate include engaging means for accomplishing the connection of said housing means at a plurality of rotative positions with respect to the center of the base plate, whereby the location of the bait basket means with respect to said entry means can be readily varied by changing the rotative position of the housing means on the base plate.

2. The snail trap according to claim 1, wherein the entry means comprises a lateral opening provided with at least one locking pawl pivotally suspended from a shaft mounted on said housing means in such manner as to prevent exit from the housing.

3. The snail trap according to claim 1, wherein said mounting means comprises an annular flange eccentrically located on said base plate.

4. The snail trap according to claim 1, wherein said base plate, said engaging means, and said housing means are circular and thereby allow for the rotation of the housing means relative to the base plate.

5. The snail trap according to claim 3, further comprising as additional mounting means a second annular flange centrally located on said base plate.

6. The snail trap according to claim 3, wherein the housing means is transparent and the entry means is opaque.

7. The snail trap according to claim 4, wherein the entry means comprises a lateral opening provided with at least one locking pawl pivotally suspended from a shaft mounted on said housing means in such manner as to prevent exit from the housing.

8. The snail trap according to claim 4, wherein said mounting means is an annular flange eccentrically located on said base plate.

9. The snail trap according to claim 5, wherein the housing means is transparent and the entry means is opaque.

10. The snail trap according to claim 6, wherein said bait basket means comprises means for its snap engagement with said annular flange.

11. The snail trap according to claim 8, further comprising as additional mounting means a second annular flange centrally located on said base plate.

12. The snail trap according to claim 8, wherein the housing means is transparent and the entry means is opaque.

13. The snail trap according to claim 9, wherein said bait basket means comprises means for its snap engagement with either of said annular flanges.

14. The snail trap according to claim 11, wherein the housing means is transparent and the entry means is opaque.

15. The snail trap according to claim 12, wherein said bait basket means comprises means for its snap engagement with said annular flange.

16. The snail trap according to claim 14, wherein said bait basket means comprises means for its snap engagement with either of said annular flanges.

17. The snail trap according to claim 15, wherein the entry means comprises a lateral opening provided with at least one locking pawl pivotally suspended from a shaft mounted on said housing means in such manner as to prevent exit from the housing.

* * * * *